United States Patent
Schwarz et al.

(10) Patent No.: US 12,434,958 B2
(45) Date of Patent: Oct. 7, 2025

(54) METERING DEVICE FOR ADJUSTING AND/OR CONTROLLING A GAS FLOW, METHOD FOR ADJUSTING AND/OR CONTROLLING A GAS FLOW, AND DOMESTIC APPLIANCE ASSEMBLY

(71) Applicant: EUGSTER / FRISMAG AG, Amriswil (CH)

(72) Inventors: Kasimir Schwarz, Tägerwilen (CH); Remo Sonderegger, Tägerwilen (CH)

(73) Assignee: EUGSTER / FRISMAG AG, Amriswil (CH)

( * ) Notice: Subject to any disclaimer, the term of this patent is extended or adjusted under 35 U.S.C. 154(b) by 148 days.

(21) Appl. No.: 18/555,057

(22) PCT Filed: May 23, 2022

(86) PCT No.: PCT/EP2022/063862
  § 371 (c)(1),
  (2) Date: Oct. 12, 2023

(87) PCT Pub. No.: WO2022/248391
  PCT Pub. Date: Dec. 1, 2022

(65) Prior Publication Data
  US 2024/0199403 A1 Jun. 20, 2024

(30) Foreign Application Priority Data
  May 26, 2021 (DE) .......................... 102021205360.2

(51) Int. Cl.
  B67D 1/12 (2006.01)
  B67D 1/00 (2006.01)
  (Continued)

(52) U.S. Cl.
  CPC ......... B67D 1/1252 (2013.01); B67D 1/0075 (2013.01); G01F 11/36 (2013.01);
  (Continued)

(58) Field of Classification Search
  CPC .. B67D 1/1252; B67D 1/0075; B67D 1/0069; G01F 11/36; G01F 15/005; G01F 15/16; G05D 7/0632
  See application file for complete search history.

(56) References Cited

U.S. PATENT DOCUMENTS 4,665,809 A 5/1987 Aschberger et al.
11,675,374 B2 * 6/2023 Sipka ..................... G01F 25/15
  700/282

(Continued)

FOREIGN PATENT DOCUMENTS

WO 2014/152755 A2 9/2014

OTHER PUBLICATIONS

International Search Report and Written Opinion dated Sep. 14, 2022, for International Application PCT/EP2022/063862.
(Continued)

Primary Examiner — Vishal Pancholi
(74) Attorney, Agent, or Firm — The Dobrusin Law Firm, P.C.

(57) ABSTRACT

The invention relates to a metering device for adjusting and/or controlling a gas flow, characterised in that the metering device comprises an electrically controllable valve, wherein the gas flow through the metering device can be adjusted and/or controlled by means of the electrically controllable valve,—wherein the metering device has a pressure sensor, wherein a gas pressure difference across a gas-outlet opening in the metering device can be measured by means of the pressure sensor, wherein the electrically controllable valve can be adjusted according to the measured gas pressure difference; and/or—wherein the metering device comprises an adjustable pressure-control device, wherein a maximum gas pressure difference between an inlet region of the metering device and an outlet region of the metering device can be set by means of the adjustable
(Continued)

pressure-control device, wherein the gas flow through the metering device, which gas flow can be adjusted by means of the electrically controllable valve, is limited by the maximum gas pressure difference between the inlet region of the metering device and the outlet region of the metering device which is set by means of the adjustable pressure-control device.

20 Claims, 3 Drawing Sheets

(51) Int. Cl.
*G01F 11/36* (2006.01)
*G01F 15/00* (2006.01)
*G01F 15/16* (2006.01)
*G05D 7/06* (2006.01)

(52) U.S. Cl.
CPC ............ *G01F 15/005* (2013.01); *G01F 15/16* (2013.01); *G05D 7/0635* (2013.01)

(56) References Cited

U.S. PATENT DOCUMENTS

| | | |
|---|---|---|
| 2004/0238040 A1 | 12/2004 | Furukawa |
| 2014/0158211 A1 | 6/2014 | Ding et al. |
| 2016/0252912 A1* | 9/2016 | Horwitz ..................... G01F 1/88 137/2 |
| 2020/0207603 A1* | 7/2020 | Sevcik ................ B01F 25/3141 |

OTHER PUBLICATIONS

International Preliminary Report on Patentability dated Aug. 11, 2023, for International Application PCT/EP2022/063862.

\* cited by examiner

METERING DEVICE FOR ADJUSTING AND/OR CONTROLLING A GAS FLOW, METHOD FOR ADJUSTING AND/OR CONTROLLING A GAS FLOW, AND DOMESTIC APPLIANCE ASSEMBLY

PRIOR ART

The present invention proceeds from a metering device for adjusting and/or controlling a gas flow. The present invention relates also to a method for adjusting and/or controlling a gas flow by means of a metering device. The present invention relates further to a domestic appliance assembly comprising a domestic appliance and a metering device.

Systems for metering gas are generally known. Such metering devices are used to adjust a gas flow. For example, a mass flow of gas can be adjusted to a value by means of a pressure reduction valve (with or without the starting pressure being displayed), a throttle valve, a flow restrictor or a solenoid valve. The current mass flow of gas is typically not quantified.

Gas metering devices are used, for example, as part of domestic appliances, such as various food preparation machines.

A disadvantage of known systems is that it is in most cases not possible to adjust a mass flow of gas variably and nevertheless precisely. For example, it is typically not possible with known systems to provide a compact, inexpensive and variably adjustable gas metering system for the range of comparatively small gas flow quantities.

DISCLOSURE OF THE INVENTION

Accordingly, it is an object of the present invention to provide an advantageous metering device for adjusting and/or controlling a gas flow, which device in particular allows the gas flow to be variably adjusted in a cost-efficient manner and/or with increased convenience for the user.

The object of the present invention is achieved by a metering device for adjusting and/or controlling a gas flow, characterized in that the metering device comprises an electrically activatable valve, wherein the gas flow through the metering device can be adjusted and/or controlled by means of the electrically activatable valve, wherein the metering device has a pressure sensor, wherein a gas pressure difference across a gas passage opening of the metering device can be measured by means of the pressure sensor, wherein the electrically activatable valve can be adjusted in dependence on the measured gas pressure difference; and/or wherein the metering device comprises an adjustable pressure control device, wherein a maximum gas pressure difference between an inlet region of the metering device and an outlet region of the metering device can be adjusted by means of the adjustable pressure control device, wherein the gas flow through the metering device, which can be adjusted by means of the electrically activatable valve, is limited by the maximum gas pressure difference between the inlet region of the metering device and the outlet region of the metering device that is adjusted by means of the adjustable pressure control device.

The metering device according to the invention has the advantage over the prior art that a compact and inexpensive gas metering system can be provided, with which a gas flow can be adjusted variably and precisely.

The metering device according to the invention can advantageously be used for different gas media, whereby particularly flexible possible applications are obtained.

According to the invention, the gas flow can be understood as being in particular a mass flow of gas and can comprise one gas or a plurality of gases.

According to the invention, it is advantageously possible that—in particular by electrical activation of the gas metering device—the mass flow of gas can be specified and quantified within a particular adjustment range, without a direct quantity measurement being necessary for that purpose.

According to the invention, it is advantageously possible that no mechanical adjustment of a valve by a user is necessary in order to change the mass flow of gas. A particular advantage is that, by means of the metering device according to the invention, even a comparatively small mass flow of gas, for example in the range of from 0 to 100 g/min, can variably be adjusted without mechanical actuation by a user. As a result, the metering device according to the invention is particularly advantageously suitable for use in domestic appliances. Preferably, a mass flow of gas in the range of from 0 to 10 g/min, particularly preferably in the range of from 0 to 7 g/min, can be adjusted by means of the metering device according to the invention.

As a result of the configuration according to the invention of the metering device, it is particularly advantageously possible that pressure fluctuations at the inlet and/or outlet of the metering device have no or only a slight influence on the mass flow of gas, since they can be compensated for at least partially.

It is conceivable that the gas flow can be adjusted by means of the metering device according to the invention infinitely or with graduations, in particular exactly.

According to the invention, it is conceivable that the metering device comprises a control device and/or that an external control device is associated with the metering device. The control device comprises in particular electrical switching means and/or computer means for activating and/or adjusting the metering device, in particular for activating and/or adjusting the electrically activatable valve (for example a solenoid valve).

It is conceivable according to the invention that the gas passage opening is formed by means of a measuring diaphragm.

According to a first variant embodiment of the present invention, the metering device has a pressure sensor, wherein a gas pressure difference across a gas passage opening of the metering device can be measured by means of the pressure sensor, wherein the electrically controllable valve can be adjusted in dependence on the measured gas pressure difference. As a result, it is possible that a current gas pressure difference in the metering device is measured and that conclusions about the current mass flow of gas are drawn from the measured current gas pressure difference. The electrically activatable valve can then be controlled on the basis of the determined current gas pressure difference and/or on the basis of the current mass flow of gas, so that a target value for the mass flow of gas is established. According to one embodiment of the present invention, it is conceivable that the current mass flow of gas is quantified by the metering device, whereby improved adjustment or control of the gas flow to a desired value is made possible.

According to the first variant embodiment of the present invention, it is thus advantageously possible that the measurable gas pressure difference (or the differential pressure) of the metering device is used to quantify the gas flow (or the gas flow quantity), in particular on the basis of empirically determined data of the entire adjustment range of the electrically activatable valve and/or of the activation of the electrically activatable valve as well as optionally tolerance-related performance deviations. The pressure sensor is in particular a differential pressure sensor, by means of which a difference between the pressure on an inlet side of the gas passage opening and on an outlet side of the gas passage opening can be measured.

According to a second variant embodiment of the present invention, the metering device comprises an adjustable pressure control device, wherein a maximum gas pressure difference between an inlet region of the metering device and an outlet region of the metering device can be adjusted by means of the adjustable pressure control device, wherein the gas flow through the metering device, which can be adjusted by means of the electrically activatable valve, is limited by the maximum gas pressure difference between the inlet region of the metering device and the outlet region of the metering device that is adjusted by means of the adjustable pressure control device. A constant or at least approximately constant maximum gas pressure difference can thus be adjusted by means of the pressure control device (for example by means of a membrane pressure controller and/or a piston pressure controller). As a result, precise control of the gas flow by means of the electrically activatable valve can be carried out even when apparatuses with different, in particular changing and/or varying, pressures are connected to the connections (inlet and outlet) of the metering device. According to the second variant embodiment of the present invention, it is thus advantageously possible that a constant gas pressure difference (or a constant differential pressure) is formed in the metering device by means of the pressure control device. It is possible that the constant maximum gas pressure difference of the metering device is used to quantify the gas flow (or the gas flow quantity), in particular on the basis of empirically determined data of the entire adjustment range of the electrically activatable valve and/or of the activation of the electrically activatable valve as well as optionally tolerance-related performance deviations. By means of the adjustable pressure control device it is possible in particular to form a membrane pressure controller and/or a piston pressure controller which is adapted to adjust a constant or at least approximately constant maximum pressure difference between an inlet region of the metering device and an outlet region of the metering device.

According to the second variant embodiment of the present invention, it is possible in a preferred configuration that the maximum differential pressure (or maximum gas pressure difference) between the inlet region and the outlet region of the metering device is thus preferably limited by the geometrical properties of the metering device, in particular by means of the adjustable pressure control device, to a specific maximum value, for example between 0.01 and 2.00 bar. The maximum value can be so chosen that the maximum value corresponds to the maximum mass flow of gas which is desired for a particular application. It is a particular advantage that the mass flow of gas can be controlled exactly even when the absolute gas pressure on the inlet and/or the outlet side of the metering device is not always at the same level, or not constant, that is to say there is no or at least no great dependence on the prevailing pressure difference of the absolute pressure at the inlet and at the outlet. It is particularly advantageous here that, for the correct functioning of the metering device, it is ensured that the absolute gas pressure at the inlet of the metering device, in particular at a first gas connection of the metering device, is higher at least by the maximum gas pressure difference adjusted by means of the adjustable pressure control device than the absolute pressure on the outlet side of the metering device, in particular at a second gas connection of the metering device.

Both by means of the first and by means of the second variant embodiment of the present invention, a precise and advantageous adjustment of a gas flow can thus take place, wherein the metering device can in particular be configured to be compact and cost-efficient and wherein particularly advantageously no mechanical adjustment of a valve by a user is necessary during operation of the metering device.

According to a third variant embodiment of the present invention, it is conceivable that the metering device has a pressure sensor, wherein a gas pressure difference across a gas passage opening of the metering device can be measured by means of the pressure sensor, wherein the electrically activatable valve can be adjusted in dependence on the measured gas pressure difference; and that the metering device comprises an adjustable pressure control device, wherein a maximum gas pressure difference between an inlet region of the metering device and an outlet region of the metering device can be adjusted by means of the adjustable pressure control device, wherein the gas flow through the metering device, which can be adjusted by means of the electrically activatable valve, is limited by the maximum gas pressure difference between the inlet region of the metering device and the outlet region of the metering device that is adjusted by means of the adjustable pressure control device. It is thus conceivable according to the third variant embodiment that the first and second variant embodiments can be combined.

Advantageous configurations and developments of the invention can be found in the dependent claims, as well as in the description with reference to the drawings. The statements belonging to this subject matter of the present invention also apply to the further subject matter of the present invention and vice versa.

According to one embodiment of the present invention, it is provided that the adjustable pressure control device is formed by means of an adjustable membrane and/or by means of an adjustable piston. A membrane pressure controller and/or piston pressure controller is thus preferably formed. In particular, the pressure control device thus preferably comprises a membrane pressure reducer and/or a piston pressure reducer.

According to one embodiment of the present invention, it is provided that the adjustable pressure control device, in particular the adjustable membrane and/or the adjustable piston, is mechanically adjustable by means of an adjusting means, in particular in such a manner that the maximum gas pressure difference between the inlet region of the metering device and the outlet region of the metering device can be adjusted by means of the adjusting means. It is preferably conceivable that a pressure on the membrane and/or the piston can be adjusted by means of the adjusting means. It is preferably conceivable that the membrane and/or the piston is deflectable by means of the adjusting means. It is conceivable, for example, that the membrane can be deformed by means of the adjusting means. By means of the deflection of the membrane and/or of the piston, the maximum gas pressure difference between the inlet region of the metering device and the outlet region of the metering device can be adjusted, and thus the maximum gas flow through the metering device can be limited, in particular to a maximum value. It is conceivable according to a preferred embodiment of the present invention that the adjusting means comprises an adjusting screw, wherein the deflection of the membrane and/or of the piston can be adjusted by means of the adjusting screw. The adjusting means is in particular part of the metering device and/or can be connected to the metering device.

According to one embodiment of the present invention, it is provided that the electrically activatable valve can be adjusted, in particular in dependence on the measured gas pressure difference, in such a manner that a target value for the gas pressure difference across the gas passage opening and/or a target value for the gas flow through the metering device, in particular through the gas passage opening, can be adjusted. The electrically activatable valve is adjusted in particular in dependence on the gas pressure difference measured by means of the pressure sensor. The gas flow through the metering device is in particular dependent on the gas pressure difference across the gas passage opening. It is conceivable that the target value for the gas flow and/or the target value for the gas pressure difference can be provided, chosen and/or inputted by a user by means of an input means of the metering device or by means of an input means of an apparatus that is in communication connection with the metering device. The adjustment and activation of the electrically activatable valve is preferably carried out by means of the control device of the metering device.

According to one embodiment of the present invention, it is provided that the gas flow through the metering device can be determined and/or adjusted by means of reference data, wherein the reference data relate in particular to a relationship between the gas pressure difference across the gas passage opening and the gas flow through the metering device. Particularly advantageously, it is possible that the electrically adjustable valve (for example a solenoid valve) is activated by means of the control device of the metering device on the basis of the reference data in such a manner that the target value for the gas flow through the metering device is established. It is in particular conceivable according to one embodiment of the present invention that the reference data indicate a ratio between the gas pressure difference across the gas passage opening and the gas flow through the metering device. The reference data relate in particular to a specific gas or gas mixture or are dependent on the specific gas or gas mixture.

It is advantageously possible to use a single metering device for different gas media, wherein the flow quantity can be different according to the gas, in particular where a corresponding characteristic curve or corresponding characteristic curves for a specific gas medium is or are mapped and taken into consideration in the software of the control device. Thus, corresponding reference data for a specific gas or gas mixture are preferably stored in the control device or in a memory device which is in communication connection with the control device.

According to one embodiment of the present invention, it is preferably provided that the electrically activatable valve comprises or is a solenoid valve. Precise control and regulation is possible by means of a solenoid valve. As an alternative or in addition to a solenoid valve, it is conceivable, for example, that the electrically activatable valve has a motor drive.

According to one embodiment of the present invention, it is preferably provided that the electrically activatable valve, in particular the solenoid valve, can be activated by means of a control device.

According to one embodiment of the present invention, it is provided that the solenoid valve has a 2/2-way valve which can be activated by means of the control device with a frequency, in particular a fixed or variable frequency, and with a variable on-time, in particular in such a manner that the gas flow through the metering device can be adjusted by selecting the on-time, or wherein the solenoid valve has a 2/2-way proportional valve, in which a variable opening cross section at the valve seat of the solenoid valve can be adjusted by activation by means of the control device, in particular in such a manner that the gas flow through the metering device can be adjusted by selecting the opening cross section at the valve seat.

It is conceivable in particular that the 2/2-way valve is an opening and closing valve which is able to open and close the path of the working medium, that is to say in particular of the gas or gas mixture. That the 2/2-way valve can be activated by means of the control device with a frequency, in particular a fixed or variable frequency, and with a variable on-time can also preferably be understood according to one embodiment such that the 2/2-way valve can be activated by means of the control device with a variable duty cycle, in particular in such a manner that the gas flow through the metering device can be adjusted by selecting the duty cycle.

For the 2/2-way proportional valve, it is preferably conceivable that the 2/2-way proportional valve comprises a variable and in particular adjustable opening cross section. The opening cross section can be changed by activation of the 2/2-way proportional valve by means of the control device. The gas flow that is established depends in particular on the adjusted opening cross section.

According to one embodiment of the present invention, it is provided that the maximum gas pressure difference between the inlet region of the metering device and the outlet region of the metering device that can be adjusted by means of the adjustable pressure control device corresponds to a specifiable maximum value between 0.01 bar inclusive and 2.00 bar inclusive. Particularly advantageous applicability for comparatively small mass flows of gas, as are of interest, for example, in the case of domestic appliances, can thus be achieved. A metering device with high precision and quality for use in connection with comparatively small gas flow quantities can thus be achieved.

According to one embodiment of the present invention, it is provided that the maximum gas pressure difference which can be adjusted is determined in dependence on a selectable maximum gas flow. The selectable maximum gas flow can be dependent, for example, on the specific application of the metering device and can be adjusted by means of the membrane.

According to one embodiment of the present invention, it is provided that the metering device comprises a non-return valve. The non-return valve is in particular provided to permit the gas flow from an inlet of the metering device to an outlet of the metering device and to suppress a gas flow in the opposite direction from the outlet of the metering device to the inlet of the metering device. Improved safety can thus be achieved for a large number of applications.

The present invention further provides a method for adjusting and/or controlling a gas flow by means of a metering device according to an embodiment of the present invention, wherein the metering device has a pressure sensor, wherein a gas pressure difference across a gas passage opening of the metering device is measured by means of the pressure sensor, wherein the electrically activatable valve is adjusted in dependence on the measured gas pressure difference; and/or wherein the metering device comprises an adjustable pressure control device, wherein a maximum gas pressure difference between an inlet region of the metering device and an outlet region of the metering device is adjusted by means of the adjustable pressure control device, wherein the gas flow through the metering device, which can be adjusted by means of the electrically activatable valve, is limited by the maximum gas pressure difference between the inlet region of the metering device and the outlet region of the metering device that is adjusted by means of the adjustable pressure control device.

Particularly efficient and flexible adjustment and/or control of a gas flow can thus be achieved. Particularly advantageously, precise adjustment and/or control of a gas flow is possible even when there are fluctuations in the absolute pressure on the inlet side of the metering device and/or fluctuations of the absolute pressure on the outlet side of the metering device. Precise adjustment and/or control of a gas flow is thus possible even when the gas pressure of the apparatus connected on the inlet side of the metering device (for example a gas bottle, gas cartridge or gas feed line) and/or the gas pressure of the apparatus connected on the outlet side of the metering device (for example a consumer device) fluctuates. An advantageous adjustment and/or control of the gas flow can thus be achieved even when the gas pressure difference of the apparatuses connected on the inlet side and the outlet side is not constant, that is to say, for example, changes or fluctuates over time.

According to one embodiment of the present invention, it is provided that the gas flow is formed by a gas or a gas mixture, wherein, for a given gas passage cross section of the gas passage opening and for the gas or the gas mixture, reference data, in particular a profile curve of the gas flow in dependence on the measured gas pressure difference across the gas passage opening, are determined, wherein the electrically activatable valve is activated and/or adjusted in dependence on the reference data in such a manner that the gas pressure difference that is established across the gas passage opening corresponds to a selectable gas flow. The gas pressure difference that is established across the gas passage opening can also be understood according to one embodiment of the present invention as being a mean gas pressure difference (for example averaged over one or more cycles or periods of a 2/2-way valve).

When the reference data or the profile curve have been determined once, the electrically activatable valve (for example a solenoid valve) can be so adjusted—for a desired or selectable gas flow—on the basis of the reference data or profile curve that the gas pressure difference gives the gas passage opening that corresponds to the desired or selectable gas flow.

The determination of the reference data can take place in a preliminary phase using the metering device. Alternatively, it is conceivable that the determination of the reference data takes place by means of a further metering device. The further metering device is particularly preferably an apparatus that is structurally identical or similar to the metering device. The profile curve preferably corresponds to the ratio of the gas differential pressure to the mass flow of gas.

In the case where the metering device comprises the adjustable pressure control device (and optionally no pressure sensor), it is preferably conceivable that the determination of the reference data takes place, for example, in the preliminary phase using the metering device or the further metering device in such a manner that (in particular for a specific gas or gas mixture) the gas flow is determined and/or ascertained in dependence on an activation of the electrically activatable valve, for example by means of an external test and/or calibration device. On the basis of these reference data, a precise and advantageous adjustment of the gas flow can take place during operation of the metering device by a corresponding activation of the electrically activatable valve, in particular because it can be ensured by means of the pressure control device during operation of the metering device that there is an at least approximately constant maximum gas pressure difference between an inlet region of the metering device and an outlet region of the metering device. In the case where the metering device comprises the pressure control device, it is therefore possible according to a particularly preferred embodiment that, for a specific gas passage cross section at the valve seat of the solenoid valve or at a diaphragm and a specific gas or gas mixture, a profile curve is prepared, using empirical data, which corresponds to the ratio of the duty factor (in the case of a 2/2-way valve) or of the opening cross section (in the case of a 2/2-way proportional valve) to the mass flow of gas. When this profile curve has been determined once, the solenoid valve can be so controlled that a desired mass flow of gas is established.

In the case where the metering device comprises the pressure sensor, it is preferably conceivable that the gas flow (or mass flow of gas) is approximately proportional to the measured gas pressure difference which is established across the gas passage opening of the measuring diaphragm. For a specific gas passage cross section in the measuring diaphragm and a specific gas, a profile curve can be prepared, using empirical data, which corresponds to the ratio of the gas pressure difference to the mass flow of gas. When this profile curve has been determined once, the electrically activatable valve (for example a solenoid valve) can be so controlled or regulated that the (mean) differential pressure corresponds to the desired mass flow of gas.

According to one embodiment of the invention, it is conceivable that the adjustable pressure control device is adjusted, and in particular fixed, in particular by means of a test and/or calibration apparatus and in particular by means of the adjusting means, in such a manner that, in the case of a fully open position of the electrically activatable valve, the maximum gas pressure difference between the inlet region and the outlet region that can be adjusted is present. An advantageous adjustment of the adjustable pressure control device (in particular of the membrane and/or of the piston) can thus be carried out, so that the adjustable pressure control device limits the gas flow during later operation of the metering apparatus independently of a current setting of the electrically activatable valve.

According to one embodiment of the present invention, it is conceivable that the gas flow is formed by $CO_2$ or comprises $CO_2$. The use of $CO_2$ is conceivable, for example, for a carbonating machine, in particular a drinks making machine. However, other gases or gas mixtures are also suitable for other applications of the metering device.

According to one embodiment of the present invention, it is conceivable that the selectable gas flow can be selected and/or adjusted, in particular by a user, in a range from 0 g/min to at least 100 g/min inclusive, preferably from 0 g/min to at least 10 g/min, particularly preferably from 0 g/min to at least 7 g/min.

The present invention further provides a domestic appliance assembly, comprising a domestic appliance and a metering device according to an embodiment of the present invention.

It is conceivable that the metering device is part of the domestic appliance and/or is integrated into the domestic appliance. Alternatively, it is conceivable that the metering device is a device which is separate from the domestic appliance and is connected to the domestic appliance. It is conceivable that the metering device is connected directly to the domestic appliance or that the metering device is connected to the domestic appliance by way of further means, for example a gas line.

According to one embodiment of the present invention, it is provided that the domestic appliance is a drinks making machine, wherein a gas or gas mixture, in particular $CO_2$, can be added by means of the metering device to a drink and/or a preliminary substance for making a drink, wherein the gas flow of the gas or gas mixture can be adjusted by means of the metering device. The drinks making machine can in particular be a carbonating machine, a drinking water dispenser and/or soda maker, and/or a cold drinks machine. It is conceivable that a user can select a drink with a specific $CO_2$ content by way of an input means, in particular an interface, of the drinks making machine, wherein the desired amount of $CO_2$ is added to the water and/or the drink substance and/or preliminary substance directly (in-line) by way of the metering device while the drink is being prepared.

According to one embodiment of the present invention, it is provided that the domestic appliance is a gas grill, wherein a gas flow of the gas grill can be adjusted by means of the metering device. It is conceivable in particular that the gas grill comprises an input means, in particular an interface, wherein the gas grill is adapted such that a user can set a target temperature, in particular a grilling temperature, by way of the input means. Preferably, a control device of the gas grill and/or of the metering device controls the gas flow through the metering device on the basis of the current temperature in the grill (which can be measured, for example, by means of a temperature sensor of the gas grill). In particular, the control device controls the gas flow through the metering device on the basis of the current temperature in the grill in such a manner that the gas flow through the metering device is so controlled or adapted that the target temperature is reached. The gas or the gas flow is used in the gas grill in particular for heating or grilling foods.

For the method according to the invention for adjusting and/or controlling a gas flow and for the domestic appliance assembly according to the invention, the features, embodiments and advantages which have already been described in connection with the metering device according to the invention or in connection with an embodiment of the metering device according to the invention can be used. For the method according to the invention for adjusting and/or controlling a gas flow and for the metering device according to the invention, the features, embodiments and advantages which have already been described in connection with the domestic appliance assembly according to the invention or in connection with an embodiment of the domestic appliance assembly according to the invention can be used. For the domestic appliance assembly according to the invention and for the metering device according to the invention, the features, embodiments and advantages which have already been described in connection with the method according to the invention for adjusting and/or controlling a gas flow or in connection with an embodiment of the method according to the invention for adjusting and/or controlling a gas flow can be used.

Further details, features and advantages of the invention will become apparent from the drawings and from the following description of preferred embodiments with reference to the drawings. The drawings merely illustrate exemplary embodiments of the invention, which do not limit the essential concept of the invention.

EMBODIMENTS OF THE INVENTION

Figure 1:
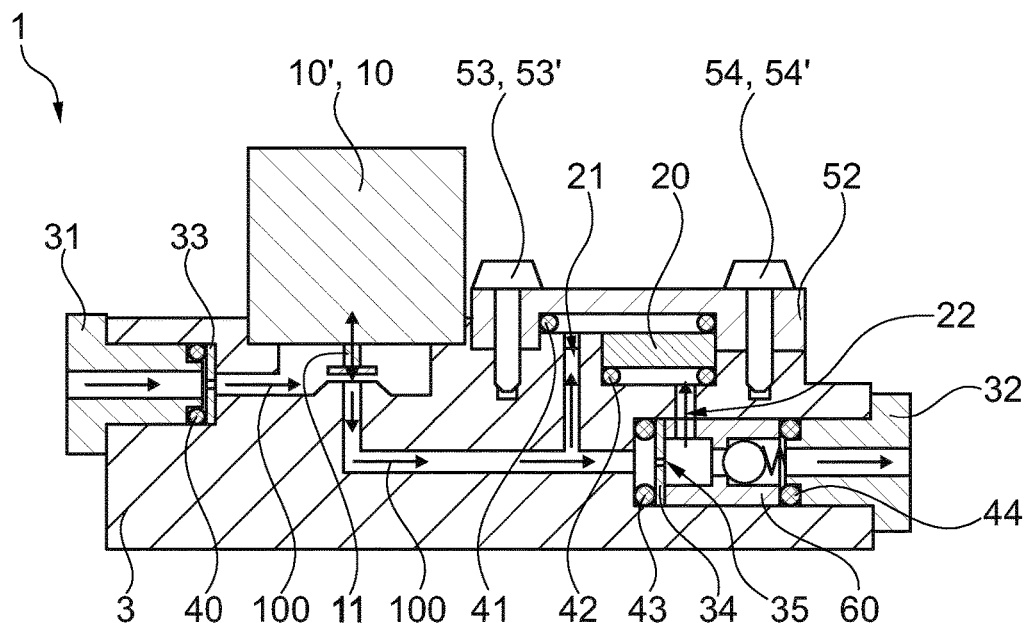
FIG. 1 shows a schematic representation of a metering device according to a first exemplary embodiment of the present invention.

FIG. 1 shows a schematic sectional view of a metering device 1 according to a first exemplary embodiment of the present invention. The metering device 1 is provided for adjusting and/or controlling a gas flow 100. The gas flow 100 can be formed by a gas or a gas mixture, wherein the gas or gas mixture used can be different for different applications of the metering device 1. In FIG. 1, the arrows 100 indicate the gas flow direction of the gas or gas mixture. The metering device 1 comprises a first gas connection 31 on an inlet side of the metering device 1 and a second gas connection 32 on an outlet side of the metering device 1. By means of the first gas connection 31, the metering device 1 can be connected, for example, to a gas supply and/or a gas reservoir, such as, for example, a gas cartridge or bottle, for example by way of a gas line. Alternatively or in addition, it is conceivable that the gas supply can also pass to the valve and/or to the metering device from a pressure reducer via a gas line. By means of the second gas connection 32, the metering device 1 can be connected, for example, to a domestic appliance which requires a gas or gas mixture in order to perform an appliance function of the appliance. By means of the metering device 1, the quantity of gas provided to such an appliance, or the mass flow of gas provided to the appliance on the outlet side of the metering device, can be adjusted and controlled. It is optionally conceivable that the metering device 1 has an inlet diaphragm 33 downstream of the first gas connection 31. For sealing the transition between the first gas connection 31 and the housing 3 of the metering device 1 (and preferably likewise for sealing the transition between the inlet diaphragm 33 and the housing 3), a seal 40 is formed in the region of this transition. The housing 3 of the metering device 1 can be in one-part or multi-part form.

The metering device 1 comprises an electrically activatable valve 10', which in the embodiment shown is in the form of a solenoid valve 10 having a valve plunger 11. The gas flow through the metering device 1 can be adjusted and/or controlled by means of the solenoid valve 10.

According to a preferred embodiment, the solenoid valve 10 has either the function of a 2/2-way valve, which is activated by means of electrical activation with a fixed or variable frequency and a variable on-time, or the function of a 2/2-way proportional valve, in which the opening cross section at the valve seat is variably adjusted by way of the electrical activation. In both cases, the mass flow of gas is determined and/or changed by activation of the solenoid valve 10.

Downstream of the solenoid valve 10 in the gas flow direction there is arranged a measuring diaphragm 34 having a gas passage opening 35. The metering device 1 further comprises a pressure sensor 20, which is configured to measure the gas pressure difference across the measuring diaphragm 34. A gas channel 21 leads from a region formed upstream of the measuring diaphragm 34 in the gas flow direction to the pressure sensor 20. A further gas channel 22 leads from a region formed downstream of the measuring diaphragm 34 in the gas flow direction to the pressure sensor 20. The pressure sensor 20 is thus in the form of a differential pressure sensor and is adapted to measure the gas pressure difference on both sides of the measuring diaphragm 34 (and thus across the gas passage opening 35). The mass flow of gas through the metering device 1 is at least approximately proportional to the measured differential pressure which is established across the measuring diaphragm 34. For a specific gas passage cross section of the gas passage opening 35 in the measuring diaphragm 34 and a specific gas or gas mixture, a profile curve can be prepared, using empirical data, which relates to and/or indicates a relationship between the gas pressure difference determined by means of the pressure sensor 20 and the mass flow of gas. For example, the profile curve can indicate a ratio of the gas pressure difference to the mass flow of gas. When this profile curve has been determined once, the solenoid valve 10 can be so controlled and/or regulated that the mean gas pressure difference across the measuring diaphragm 34, which can be determined and/or monitored by means of the pressure sensor 20 during operation of the metering device, corresponds to the desired mass flow of gas. An advantageous and precise adjustment and control of the gas flow can thus be carried out without any mechanical interaction by a user, such as, for example, adjustment of a screw or a valve, being necessary.

The pressure sensor 20 is covered on its upper side by means of a cover 52. A portion of the gas channel 21 is further formed by means of the cover 52. The cover 52 is optionally fastened to the housing 3, preferably reversibly, by way of connecting means 53, 54, in particular by way of screw connections 53', 54'. It is conceivable that the pressure sensor 20 can be uncovered, in particular outside of operation of the metering device 1, by removing the cover 52. In order to seal the transition between the cover 52 and the housing 3, a seal 41 is arranged in the region of this transition. The seal 41 is in particular also located in part on the upper side of the pressure sensor 20. On the lower side of the pressure sensor 20, in particular at a transition between the pressure sensor 20 and the housing 3, there is arranged a further seal 42 for sealing this transition. An additional seal 43 is situated at the transition between the housing 3 and the measuring diaphragm 34 for sealing the transition between the measuring diaphragm 34 and the housing 3.

The metering device 1 optionally further comprises a non-return valve 60, which is arranged upstream of the second gas connection 32, that is to say upstream of the outlet of the metering device 1, and downstream of the measuring diaphragm 34 in the gas flow direction. The non-return valve 60 advantageously restricts the gas flow to the intended direction from the inlet to the outlet, that is to say from the first gas connection 31 to the second gas connection 32, and suppresses an undesirable gas flow in the opposite direction. At the transition between the non-return valve 60, the second gas connection 32 and the housing 3 there is arranged a seal 44 for sealing this transition.

Figure 2:
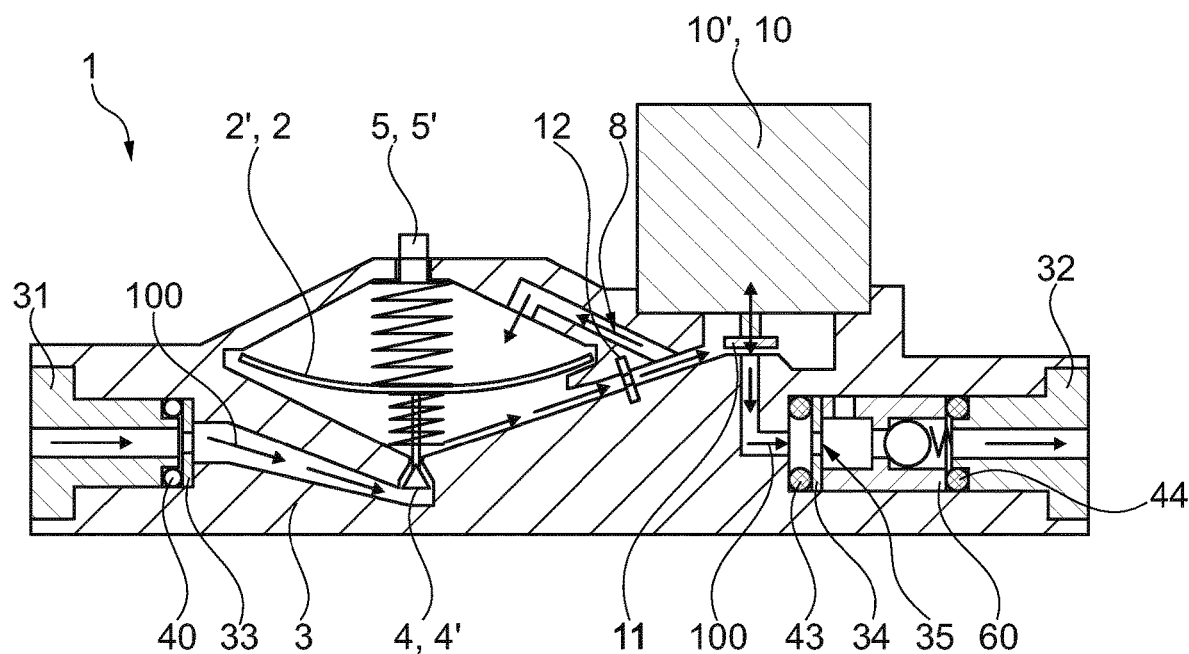
FIG. 2 shows a schematic representation of a metering device according to a second exemplary embodiment of the present invention.

FIG. 2 shows a schematic sectional view of a metering device 1 according to a second exemplary embodiment of the present invention. The metering device 1 is provided for adjusting and/or controlling a gas flow 100. The gas flow 100 can be formed by a gas or a gas mixture, wherein the gas or gas mixture used can be different for different applications of the metering device 1. The arrows 100 symbolize the gas flow direction of the gas or gas mixture. The metering device 1 comprises a first gas connection 31 on an inlet side of the metering device 1 and a second gas connection 32 on an outlet side of the metering device 1. By means of the first gas connection 31, the metering device 1 can be connected, for example, to a gas supply and/or a gas reservoir, such as, for example, a gas cartridge or bottle, for example by way of a gas line. By means of the second gas connection 32, the metering device 1 can be connected, for example, to a domestic appliance which requires a gas or gas mixture in order to perform an appliance function of the appliance. By means of the metering device 1, the quantity of gas provided to such an appliance, or the mass flow of gas provided to the appliance on the outlet side of the metering device 1, can be adjusted and controlled. The metering device 1 optionally comprises an inlet diaphragm 33 downstream of the first gas connection 31. For sealing the transition between the first gas connection 31, the housing 3 of the metering device 1 and the inlet diaphragm 33, a seal 40 is arranged in the region of this transition. The housing 3 of the metering device 1 can be in one-part or multi-part form. The metering device 1 has an adjustable pressure control device 2'. The pressure control device 2' is preferably configured as a piston pressure controller and/or membrane pressure controller (or by means of a piston pressure reducer and/or a membrane pressure reducer). In the embodiment shown, the pressure control device 2' has an adjustable membrane 2. The spaces on both sides of the membrane 2 are connected together by way of a diaphragm 12, in particular a differential pressure diaphragm, and by means of a connecting channel 8. The membrane 2 is connected to a valve 4, in particular a conical valve 4', wherein the valve 4 can be adjusted by means of the membrane 2, in particular in dependence on a deformation and/or deflection of the membrane 2. For adjusting the membrane 2 there is provided on the metering device 1 an adjusting means 5, in particular an adjusting screw 5'. In particular, the membrane 2 and the adjusting means 5 are connected by means of a spring device. By way of the adjusting means 5, the pressure on the membrane 2 and thus in particular also the passage cross section of the valve 4 can be adjusted. The diaphragm 12 is so installed that, in the case of a gas flow, a differential pressure is established across the membrane 2, so that the valve 4 is adjusted. By way of the adjustable membrane 2 and the valve 4, a maximum gas pressure difference between an inlet region of the metering device 1 and an outlet region of the metering device 1 can thus be adjusted and in particular specified. By means of the membrane 2, the gas flow through the metering device 1 can thus be limited to a maximum value. Downstream of the membrane 2 in the gas flow direction there is formed an electrically activatable valve 10', which comprises a solenoid valve 10 having a valve plunger 11.

The gas flow through the metering device 1 can be adjusted and/or controlled by means of the solenoid valve 10, wherein the gas flow which can be adjusted by means of the solenoid valve 10 is limited by the maximum value adjusted by means of the membrane 2. To this end, the membrane 2 is adjusted and fixed by way of the adjusting means 5, preferably on or by means of a test and/or calibration apparatus, in such a manner that, when the solenoid valve 10 is fully open, a specific differential pressure is present between the inlet side and the outlet side. According to a preferred embodiment, the solenoid valve 10 has either the function of a 2/2-way valve, which is activated by means of electrical activation with a fixed or variable frequency and a variable on-time, or the function of a 2/2-way proportional valve, in which the opening cross section at the valve seat is variably adjusted by way of the electrical activation. In both cases, the mass flow of gas through the metering device 1 is determined and/or changed by activation of the solenoid valve 10. The mass flow of gas is at least approximately proportional to the duty factor of the 2/2-way valve, or to the opening cross section of the 2/2-way proportional valve. For a specific gas passage cross section at the valve seat of the solenoid valve 10 (or in the case of a diaphragm) and a specific gas or gas mixture, a profile curve is prepared preferably using empirical data, particularly preferably by means of measurements, which profile curve (i) in the case of a 2/2-way valve—indicates a relationship between the duty factor and the mass flow of gas, or (ii) in the case of a 2/2-way proportional valve—indicates a relationship between the opening cross section and the mass flow of gas.

Particularly preferably, the profile curve indicates (i) in the case of a 2/2-way valve—the ratio between the duty factor and the mass flow of gas, or (ii) in the case of a 2/2-way proportional valve—the ratio between the opening cross section and the mass flow of gas.

Figure 3:
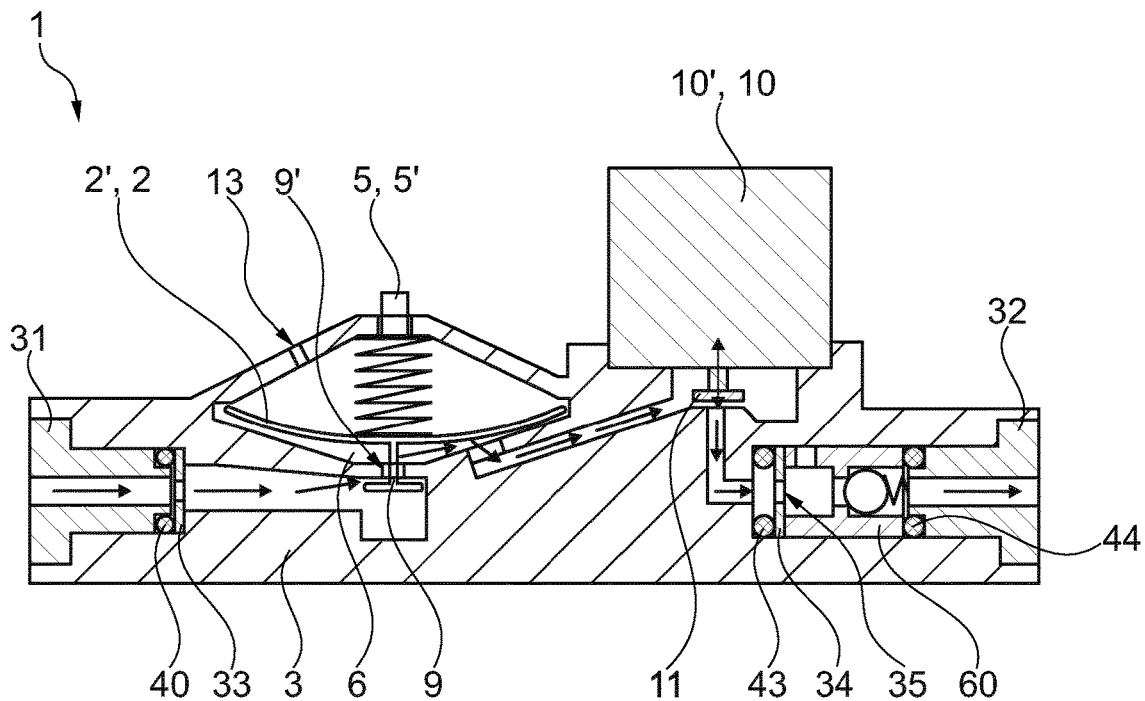
FIG. 3 shows a schematic representation of a metering device according to a third exemplary embodiment of the present invention.

FIG. 3 shows a schematic sectional view of a metering device 1 according to a third exemplary embodiment of the present invention. As in the second exemplary embodiment according to FIG. 2, there is present in the third exemplary embodiment an adjustable membrane 2 by means of which a maximum gas pressure difference between the inlet region of the metering device 1 and the outlet region of the metering device 1 can be adjusted, so that the maximum gas flow through the metering device 1 is limited. Unlike in the second exemplary embodiment shown in FIG. 2, there is no conical valve 4' in the third exemplary embodiment. The metering device 1 according to the third exemplary embodiment comprises an intermediate chamber 6, which is formed in particular adjacent to the membrane 2. As in the second exemplary embodiment, an adjusting means 5, in particular an adjusting screw 5', is formed on the metering device 1 for adjusting the membrane 2. By way of the adjusting means 5, the pressure on the membrane 2 can be adjusted. The chamber of the membrane 2 has on the side of the membrane 2 remote from the intermediate chamber 6 a passageway 13 to the environment or atmosphere. On the side of the membrane 2 that is remote from the intermediate chamber 6, atmospheric pressure and the pressure that can be adjusted by means of the adjusting means thus act on the membrane 2. The membrane 2 is connected to a valve element 9, which can thus be adjusted by way of the membrane 2. The membrane 2 and the valve element 9 are arranged on opposite sides of a passage 9'. By way of the membrane, the valve element 9 is so adjusted that a maximum gas pressure difference between an inlet region of the metering device 1 and an outlet region of the metering device 1 can be adjusted and in particular specified. The membrane 2 and the valve element 9 thus regulate in particular an excess pressure to the atmosphere or to the environment. By means of the membrane 2, the gas flow through the metering device 1 can thus be limited to a maximum value. The gas flow through the metering device 1 can be adjusted and/or controlled by means of the solenoid valve 10, wherein the gas flow which can be adjusted by means of the solenoid valve 10 can be limited by the adjustment of the membrane 2. Correspondingly to the second exemplary embodiment, the membrane 2 is to this end adjusted and fixed preferably on or by means of a test and/or calibration apparatus in such a manner that, when the solenoid valve 10 is fully open, a specific differential pressure is present between the inlet side and the outlet side. The solenoid valve 10 preferably has either the function of a 2/2-way valve, which is activated by means of electrical activation with a fixed or variable frequency and a variable on-time, or the function of a 2/2-way proportional valve, in which the opening cross section at the valve seat is variably adjusted by way of the electrical activation. In both cases, the mass flow of gas through the metering device 1 is determined and/or changed by activation of the solenoid valve 10.

Unlike in the first exemplary embodiment shown in FIG. 1, the metering device 1 according to the second and third exemplary embodiments does not have a pressure sensor 20. However, it is conceivable according to further embodiments of the present invention to configure a metering device 1 both with a membrane 2 (for example according to FIGS. 2 and 3) and with a pressure sensor 20 (for example according to FIG. 1).

According to the first exemplary embodiment (see FIG. 1), it is possible that the measurable differential pressure, or the gas pressure difference across the gas passage opening 35, which can be determined by means of the pressure sensor 20, is advantageously used to quantify the gas flow quantity, in particular on the basis of empirically determined data of the entire adjustment range of the solenoid valve 10 and/or of the solenoid valve activation as well as tolerance-related performance deviations.

According to the second and third exemplary embodiments (see FIGS. 2 and 3), it is possible that a constant or approximately constant maximum gas pressure difference is formed in the metering device 1 by means of the membrane 2. This constant differential pressure is advantageously used to quantify the gas flow quantity, in particular on the basis of empirically determined data of the entire adjustment range of the solenoid valve 10 and/or of the solenoid valve activation as well as tolerance-related performance deviations. The empirically determined data are in particular reference data, which are determined, for example, in a preliminary phase for the metering device 1 and/or by means of further metering devices and/or by means of simulations.

Figure 4:
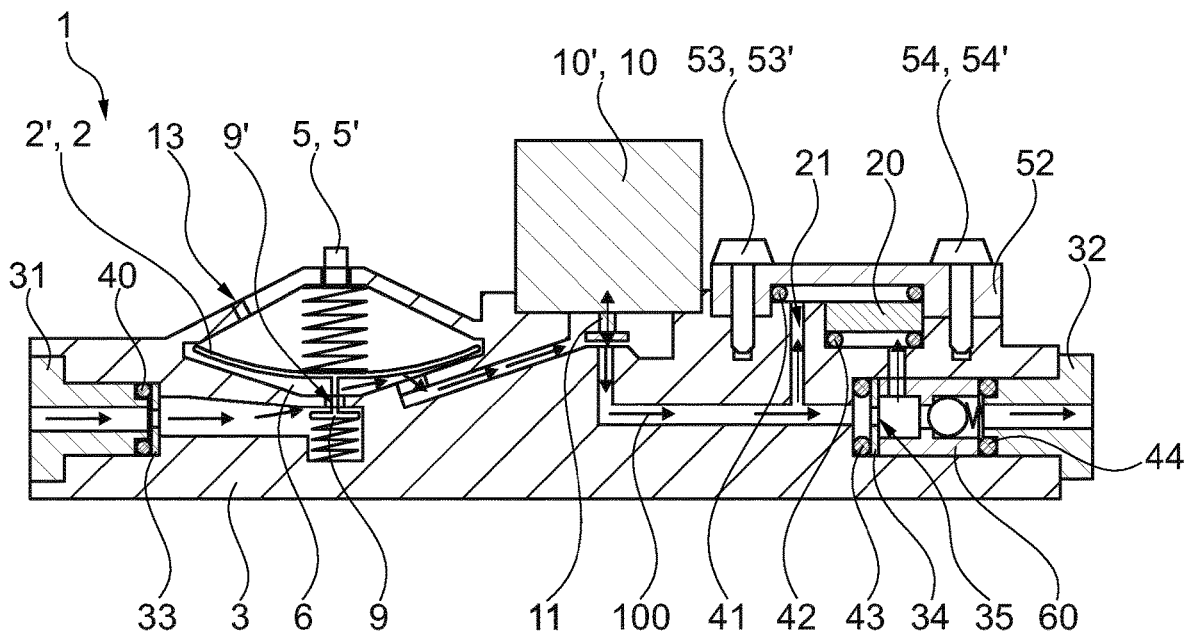
FIG. 4 shows a schematic representation of a metering device according to a fourth exemplary embodiment of the present invention.

FIG. 4 shows a schematic sectional view of a metering device 1 according to a fourth exemplary embodiment of the present invention. The fourth exemplary embodiment corresponds to the third exemplary embodiment according to FIG. 3, wherein a differential pressure control by means of a pressure sensor 20 is additionally formed. The pressure sensor 20, or the differential pressure control, can be configured, for example, according to the first exemplary embodiment of FIG. 1.

By means of a metering device 1 according to the invention, for example according to one of the preceding exemplary embodiments, in particular a comparatively small mass flow of gas in the range of from 0 to 100 g/min, in particular in the range of from 0 to 10 g/min, can be adjusted exactly, infinitely or with one or more graduations, by electrical activation of the electrically activatable valve 10', in particular the solenoid valve 10. Particularly advantageously, it is possible that the differential pressure between the gas connection on the inlet side and the gas connection on the outlet side is limited by the geometrical properties of the metering device 1 (in particular by means of the membrane 2) to a specific maximum value, preferably between 0.01 bar and 2.00 bar, in particular in dependence on the maximum mass flow of gas that is desired for a specific application. By means of a metering device 1 according to the invention, the advantage can be achieved that the mass flow of gas can be controlled exactly even when the absolute gas pressure on the inlet and/or outlet side is not always at the same level or is not constant. This means in particular that there is no or at least no great dependence on the absolute differential pressure that is present. In this case, it is preferred that, for proper functioning of the metering device 1, it is ensured that the absolute pressure at the inlet is higher at least by the specific maximum gas pressure difference (preferably between 0.01 and 2.00 bar) than the absolute pressure on the outlet side.

According to the invention, a compact and inexpensive gas metering system can thus be provided, with which a comparatively small mass flow of gas, in particular in the range of from 0 to 100 g/min, can variably be adjusted without mechanical actuation. A metering device 1 according to the invention is thus particularly advantageously suitable for use in domestic appliances 7.

Preferably, by the electrical activation of the metering device 1, in particular of the solenoid valve 10, the mass flow of gas can be specified and quantified within a specific adjustment range without a direct quantity measurement being necessary.

The maximum differential pressure and the maximum mass flow of gas can be limited to specific values, in particular by adaptation of the geometrical and mechanical properties of the metering device and in particular by means of the membrane 2.

Particularly advantageously, according to the invention, no mechanical adjustment of a valve by a user has to be carried out in order to change the mass flow of gas.

Advantageously, pressure fluctuations at the inlet and/or outlet of the metering device have no or at most a slight influence on the mass flow of gas, since such fluctuations can be compensated for wholly or at least partially.

It is a particular advantage of the present invention that a single metering device 1 can be used for different gas media. The flow quantity can differ according to the gas, provided that the corresponding characteristic curves are mapped and taken into consideration in the software of the control electronics.

Figure 5:
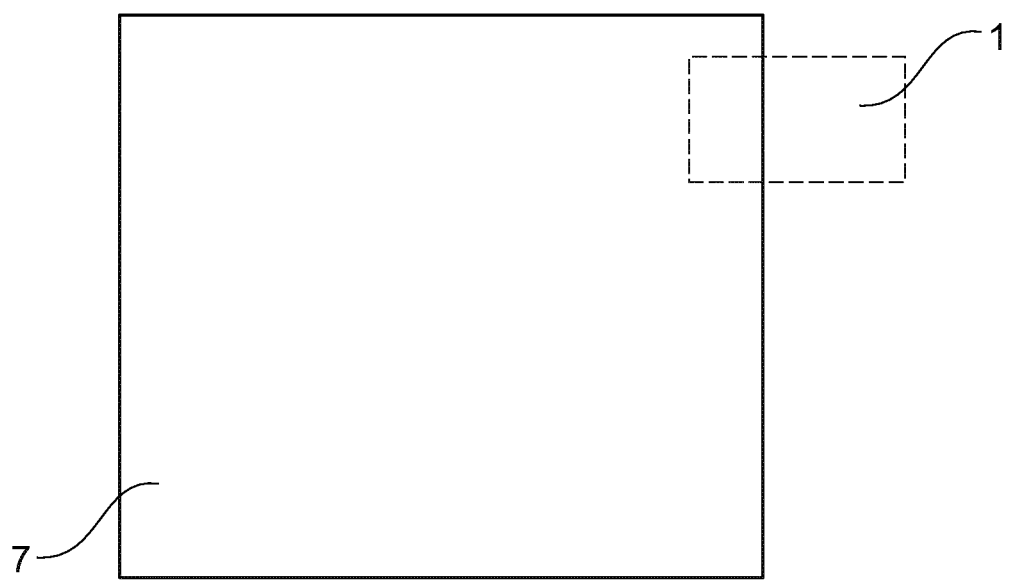
FIG. 5 shows a schematic representation of a domestic appliance assembly according to an exemplary embodiment of the present invention.

FIG. 5 shows a schematic representation of a domestic appliance assembly according to an exemplary embodiment of the present invention. The domestic appliance assembly comprises a domestic appliance 7 and a metering device 1 according to an embodiment of the present invention.

The domestic appliance 7 can be, for example, a water dispenser or a cold drinks machine, wherein the metering device 1 is used to meter a $CO_2$ flow. A user is able to select a drink with a specific $CO_2$ content by way of an interface of the domestic appliance assembly, wherein the desired quantity of $CO_2$ is added to the water or the cold drink by way of the metering device 1 directly and in particular in-line while the drink is being prepared.

Alternatively, the domestic appliance 7 can be, for example, a gas grill with temperature control. A user can set a grill temperature by way of an interface of the domestic appliance assembly, in particular the gas grill. A controller or activation controls the mass flow of gas via the metering device 1 on the basis of the current temperature in the grill.

Alternatively, other types of domestic appliance 7 are also conceivable, which can be used together with a metering device 1 according to an embodiment of the present invention.

LIST OF REFERENCE SIGNS

1 metering device
2 membrane
2' pressure control device
3 housing
4 valve
4' conical valve
5 adjusting means
5' adjusting screw
6 intermediate chamber
7 domestic appliance
8 connecting channel
9 valve element
9' passage
10 solenoid valve
10' electrically activatable valve
11 valve plunger
12 diaphragm
13 passageway
20 pressure sensor
21 gas channel
22 further gas channel
31 first gas connection
32 second gas connection
33 inlet diaphragm
34 measuring diaphragm
35 gas passage opening
40 seal
41 seal
42 seal
43 seal
44 seal
45 seal
52 cover
53 connecting means
53' screw connection
54 connecting means
54' screw connection
60 non-return valve
100 gas flow

The invention claimed is:

1. A domestic appliance assembly comprising: a domestic appliance and a metering device for adjusting and/or controlling a gas flow, wherein a mass flow of gas in a range of from 0 to about 10 g/min can be adjusted by the metering device, wherein the metering device comprises an electrically activatable valve, wherein the gas flow through the metering device can be adjusted and/or controlled by means of the electrically activatable valve, wherein the metering device has a pressure sensor,
wherein a gas pressure difference across a gas passage opening of the metering device can be measured by means of the pressure sensor, wherein the electrically activatable valve can be adjusted in dependence on the measured gas pressure difference;
and
wherein the metering device comprises an adjustable pressure control device, wherein a maximum gas pressure difference between an inlet region of the metering device and an outlet region of the metering device can be adjusted by means of the adjustable pressure control device, wherein the gas flow through the metering device, which can be adjusted by means of the electrically activatable valve, is limited by the maximum gas pressure difference between the inlet region of the metering device and the outlet region of the metering device that is adjusted by means of the adjustable pressure control device wherein the maximum gas pressure difference between the inlet region of the metering device and the outlet region of the metering device that can be adjusted by means of the adjustable pressure control device corresponds to a specifiable maximum value of between 0.01 bar inclusive and 2.00 bar inclusive.

2. The domestic appliance assembly as claimed in claim 1, wherein the adjustable pressure control device is formed by means of an adjustable membrane and/or by means of an adjustable piston.

3. The domestic appliance assembly as claimed in claim 1, wherein the adjustable pressure control device is mechanically adjustable by means of an adjusting means in such a manner that the maximum gas pressure difference between the inlet region of the metering device and the outlet region of the metering device can be adjusted by means of the adjusting means.

4. The domestic appliance assembly as claimed in claim 3, wherein the adjustable pressure control device is formed by means of an adjustable membrane and/or by means of an adjustable piston.

5. The domestic appliance assembly as claimed in claim 1, wherein the electrically activatable valve can be adjusted in such a manner that a target value for the gas pressure difference across the gas passage opening and/or a target value for the gas flow through the metering device can be adjusted.

6. The domestic appliance assembly as claimed in claim 1, wherein the gas flow through the metering device can be determined and/or adjusted by means of reference data.

7. The domestic appliance assembly as claimed in claim 6, wherein the reference data relate to a relationship between the gas pressure difference across the gas passage opening and the gas flow through the metering device.

8. The domestic appliance assembly as claimed in claim 1, wherein the electrically activatable valve comprises or is a solenoid valve.

9. The domestic appliance assembly as claimed in claim 1, wherein the electrically activatable valve can be activated by means of a control device.

10. The domestic appliance assembly as claimed in claim 9, wherein the electrically activatable valve comprises or is a solenoid valve.

11. The domestic appliance assembly as claimed in claim 10, wherein the solenoid valve has a 2/2-way valve which can be activated by means of the control device with a fixed or variable frequency, and with a variable on-time, in such a manner that the gas flow through the metering device can be adjusted by selecting the on-time,
or
wherein the solenoid valve has a 2/2-way proportional valve, in which a variable opening cross section at a valve seat of the solenoid valve can be adjusted by activation by means of the control device, in such a manner that the gas flow through the metering device can be adjusted by selecting the opening cross section at the valve seat.

12. The domestic appliance assembly as claimed in claim 1, wherein the maximum gas pressure difference which can be adjusted is determined in dependence on a selectable maximum gas flow.

13. The domestic appliance assembly as claimed in claim 1, wherein the metering device comprises a non-return valve.

14. A method for adjusting and/or controlling a gas flow by means of the domestic appliance assembly as claimed in claim 1,
wherein a mass flow of gas in a range of from 0 to about 10 g/min can be adjusted by a metering device of the domestic appliance assembly, wherein the metering device has a pressure sensor, wherein a gas pressure difference across a gas passage opening of the metering device is measured by means of the pressure sensor, wherein an electrically activatable valve is adjusted in dependence on the measured gas pressure difference;
and
wherein the metering device comprises an adjustable pressure control device, wherein a maximum gas pressure difference between an inlet region of the metering device and an outlet region of the metering device is adjusted by means of the adjustable pressure control device, wherein the gas flow through the metering device, which can be adjusted by means of the electrically activatable valve, is limited by the maximum gas pressure difference between the inlet region of the metering device and the outlet region of the metering device that is adjusted by means of the adjustable pressure control device, wherein the maximum gas pressure difference between the inlet region of the metering device and the outlet region of the metering device that can be adjusted by means of the adjustable pressure control device corresponds to a specifiable maximum value of between 0.01 bar inclusive and 2.00 bar inclusive.

15. The method as claimed in claim 14, wherein the gas flow is formed by a gas or a gas mixture, wherein, for a given gas passage cross section of the gas passage opening and for the gas or the gas mixture, reference data are determined, wherein the electrically activatable valve is activated and/or adjusted in dependence on the reference data in such a manner that the gas pressure difference that is established across the gas passage opening corresponds to a selectable gas flow.

16. The method as claimed in claim 15, wherein the reference data are a profile curve of the gas flow in dependence on the measured gas pressure difference across the gas passage opening.

17. The method as claimed in claim 14, wherein the adjustable pressure control device is adjusted and/or fixed by means of a test and/or calibration apparatus and an adjusting means in such a manner that, in a case of a fully open position of the electrically activatable valve, the maximum gas pressure difference between the inlet region and the outlet region that can be adjusted is present.

18. The method as claimed in claim 14, wherein the gas flow is formed by $CO_2$ or comprises $CO_2$.

19. The domestic appliance assembly as claimed in claim 1, wherein the domestic appliance is a drinks making machine, wherein a gas or gas mixture can be added by means of the metering device to a drink and/or a preliminary substance for making a drink, wherein the gas flow of the gas or gas mixture can be adjusted by means of the metering device.

20. The domestic appliance assembly as claimed in claim 1, wherein the domestic appliance is a gas grill, wherein the gas flow of the gas grill can be adjusted by means of the metering device.

* * * * *